United States Patent [19]

Boulter

[11] 3,892,916

[45] July 1, 1975

[54] SIGNAL RECEIVERS

[75] Inventor: Richard Arnold Boulter, St. Albans, England

[73] Assignee: The Post Office, London, England

[22] Filed: May 9, 1973

[21] Appl. No.: 358,623

[30] Foreign Application Priority Data

May 12, 1972 United Kingdom .............. 22338/72

[52] U.S. Cl. ...................... 178/88; 178/67; 178/68; 325/321

[51] Int. Cl. ........................................ H04l 27/22

[58] Field of Search ........ 325/30, 321, 320; 178/67, 178/68, 88

[56] References Cited

UNITED STATES PATENTS

| | | | |
|---|---|---|---|
| 3,242,431 | 3/1966 | Crafts | 178/66 |
| 3,335,369 | 8/1967 | Priebe | 325/30 |
| 3,349,330 | 10/1967 | Wedmore | 178/67 |
| 3,368,038 | 2/1968 | Ringelhan | 178/67 |
| 3,493,679 | 2/1970 | Chomicki | 178/67 |
| 3,590,386 | 6/1971 | Tisi et al. | 325/321 |
| 3,789,303 | 1/1974 | Hoffman et al. | 325/321 |
| 3,818,344 | 6/1974 | Muilwijk | 325/30 |

*Primary Examiner*—Robert L. Griffin
*Assistant Examiner*—Marc E. Bookbinder
*Attorney, Agent, or Firm*—Kemon, Palmer & Estabrook

[57] ABSTRACT

A circuit for converting a diphase signal into an isochronous baseband data signal, operates by extracting a clock signal from the carrier signal and combining the diphase signal and clock signal in a modulo-2 adder. The clock signal has a frequency equal to the reciprocal of the duration of one element of the baseband data and is derived by isolating a second harmonic of the carrier signal and applying it to a frequency halving circuit. The relative phase of the clock signal and the isochronous baseband signal is monitored at discrete intervals. If there is a phase error on consecutive occasions, caused by the ambiguity in the phase of the clock signal, the relative phase of the clock signal to the isochronous baseband data signal is shifted by 180°.

7 Claims, 4 Drawing Figures

AMPLITUDE FREQUENCY SPECTRUM OF PSEUDO-RANDOM PATTERN $\left(\frac{\sin\frac{\omega T}{2}}{\frac{\omega T}{2}}\right)$

AMPLITUDE FREQUENCY SPECTRUM OF DIPHASE LINE SIGNAL.

– – – – WITH IN-PHASE CARRIER

·············· WITH 90° PHASE CARRIER

SIGNAL RECEIVERS

This invention relates to digital communications systems and a method of communicating digital data in the form known as diphase or dipulse, and in particular to a receiver for use in such a communications system.

Diphase transmission is normally regarded as a baseband digital system in which 01 and 10 are transmitted to represent the 2 significant conditions of the source data. Thus the line signal is equivalent to a serial steam of pulses at twice the original modulation rate, but with a coding restriction which introduces a certain amount of correlation or redundancy. This redundancy enables clock information to be easily extracted from the received signal no matter what the content of the transmitted data. It is obvious that clock information is present at all time since a line signal transition will always occur at the centre of each data element. Following the baseband philosophy, a double speed line signal can be received in low pass form, regenerated and decoded digitally and some modems have been developed on this principle. It is necessary to incorporate means for avoiding timing and polarity ambiguities and, with some methods of reception, a 3dB signal/noise ratio penalty is incurred. More important than this, perhaps, is the fact that with all these methods the line characteristic will require equalisation up to twice the frequency required for a normal baseband transmission. Another way to consider diphase transmission is as a phase modulation or double side band supressed-carrier (DSB SC system) in which the modulating signal switches the phase of a carrier whose frequency in Hz (fundamental frequency in the case of a square wave carrier) is the same as the modulation rate in bands and the present invention is based on this way of considering diphase transmission. The signal may also be received and demodulated coherently in a double side band form by means of a carrier extracted from the line signal. This carrier is also the clock and is subject to ambiguity problems similar to those encountered with the low path form of reception. These can be overcome, however, and in addition it is found that with DSB reception the need for waveform correction is drastically reduced.

According to the present invention there is provided a method of converting a carrier signal modulated by an isochronous baseband data signal herein referred to as a diphase signal into an isochronous baseband data signal including the steps of deriving a clock signal from the carrier signal, said clock signal having a frequency equal to the reciprocal of the duration, T, of one element of the baseband data, applying the clock signal to a first input of a modulo-2 adder, applying the diphase signal to a second input of the modulo-2 adder, and regenerating the isochronous baseband data signal from an output of the modulo-2 adder.

According to a further aspect of the present invention there is provided a diphase to baseband converter comprising means for deriving a clock signal from a carrier signal modulated by an isochronous baseband data signal, said carrier signal modulated by an isochronous baseband data signal being herein referred to as a diphase signal the clock signal and said carrier signal having a common frequency equal to the reciprocal of the duration, T, of one element of the isochronous baseband data signal, said clock signal and said carrier signal having a relative phase, a modulo-2 adder having a first input, a second input, and an output, said first input arranged to receive said diphase signal, and second input arranged to receive the clock signal, and regenerating means for regenerating the isochronous baseband data signal, connected to the output of said modulo-2 adder.

A preferred embodiment of the invention will now be described, by way of example only, with reference to the accompanying drawings in which.

Figure 1:
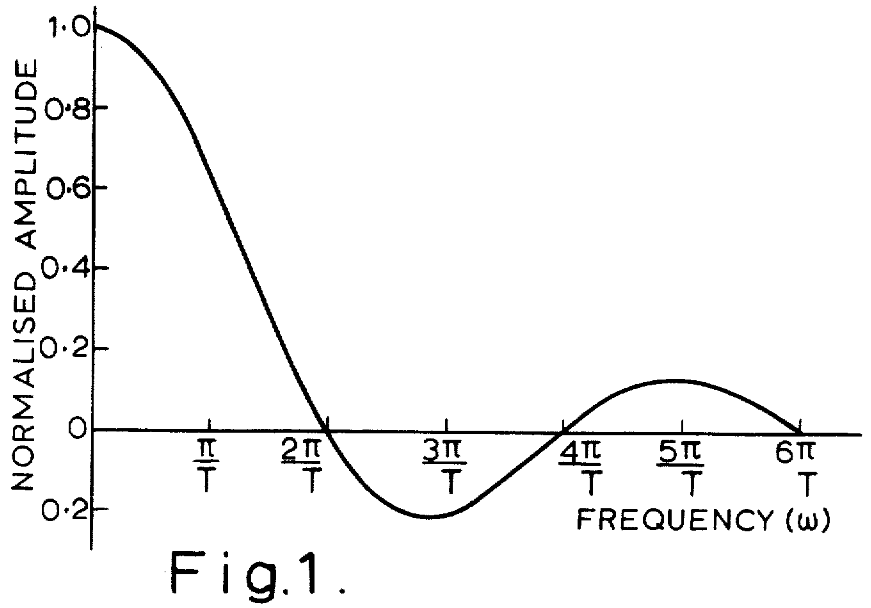
FIG. 1 shows the envelope of the amplitude-frequency spectrum of baseband data signals.
Figure 2:
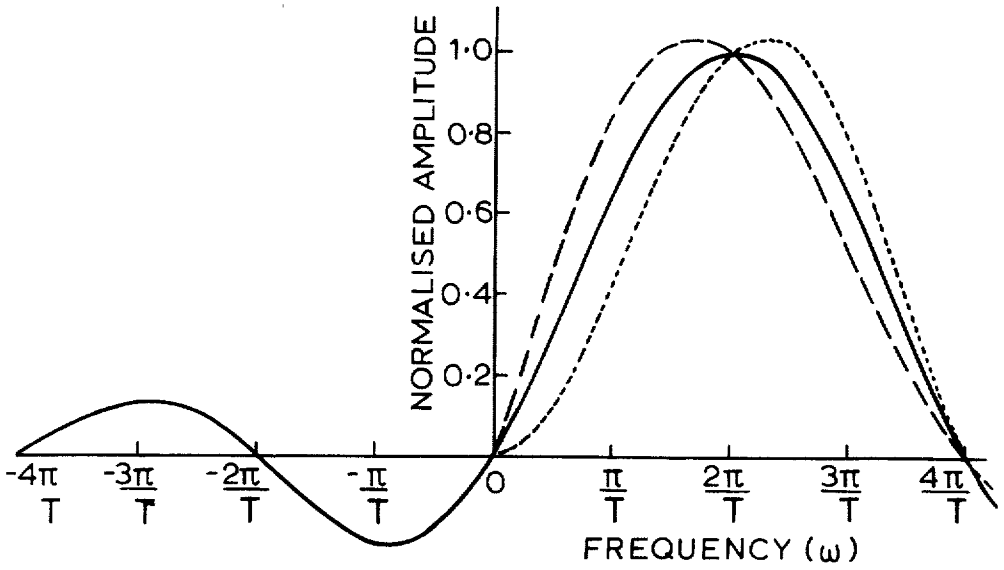
FIG. 2 shows the envelope of the amplitude-frequency spectrum of 2 forms of line signal.

If the data to be transmitted is in non-return-to-zero form, then the envelope of the baseband frequency amplitude spectrum will be, sin wt/2 /wt/2, as shown in FIG. 1. When this signal amplitude modulates a carrier of frequency equal to the modulation rate, then the problem of fold-over of the secondary lobes falling in the negative frequency domain occurs. How this fold-over affects the spectrum of the signal sent to line then depends upon the carrier phase. If the carrier is in phase with the modulating signal, that is the zero crossings of the carrier occurring at the same time as the transitions of the modulating signal, then fold-over causes the second lobe of the lower side band to add coherently to the main lobe whilst the third lobe subtracts coherently from the main lobe of the upper side band. This makes the transmit spectrum unsymetrical with more energy in the lower side band. If the carrier is shifted in phase through 90° the role is reversed, more energy appearing in the upper side band due to the second lobe substracting from the lower side band and the third adding to the upper side band. The effect on the frequency spectrum is shown in FIG. 2 along with the symetrical spectrum with equal side bands. Interference in the main signal also comes from the side bands of the DSB signal produced by the third harmonic of the carrier, but these are insignificant compared with the fold-over. Both these effects can be removed by the use of a pre-modulator filter to eliminate the secondary lobes but in fact the combination of the fold-over and 90° phase shift is advantageous in that it reduces the signal level at low frequencies where the line distortion is most severe and enhances the signal level at high frequencies where the attenuation is greatest, thus enabling greater distances to be covered without waveform correction. The latter version of diphase modulation can be described as "top hat" modulation since in the case of a square wave carrier the two significant conditions of the source data are represented by an erect and inverted top hat shape respectively. A more formal name is $WAL_2$ carrier transmission where $WAL_2$ denotes a Walsh function type 2.

In our co-pending application Ser. No. 298,518 filed Oct. 18, 1972, now U.S. Pat. No. 3,846,583, a transmitter is described in which an isochronous baseband data signal 60 k bit/s is converted into a diphase signal. A receiver is also described in which the isochronous data signal is recovered from the disphase signal. The present invention is concerned with a modification of the receiver described in the co-pending application.

Figure 3:
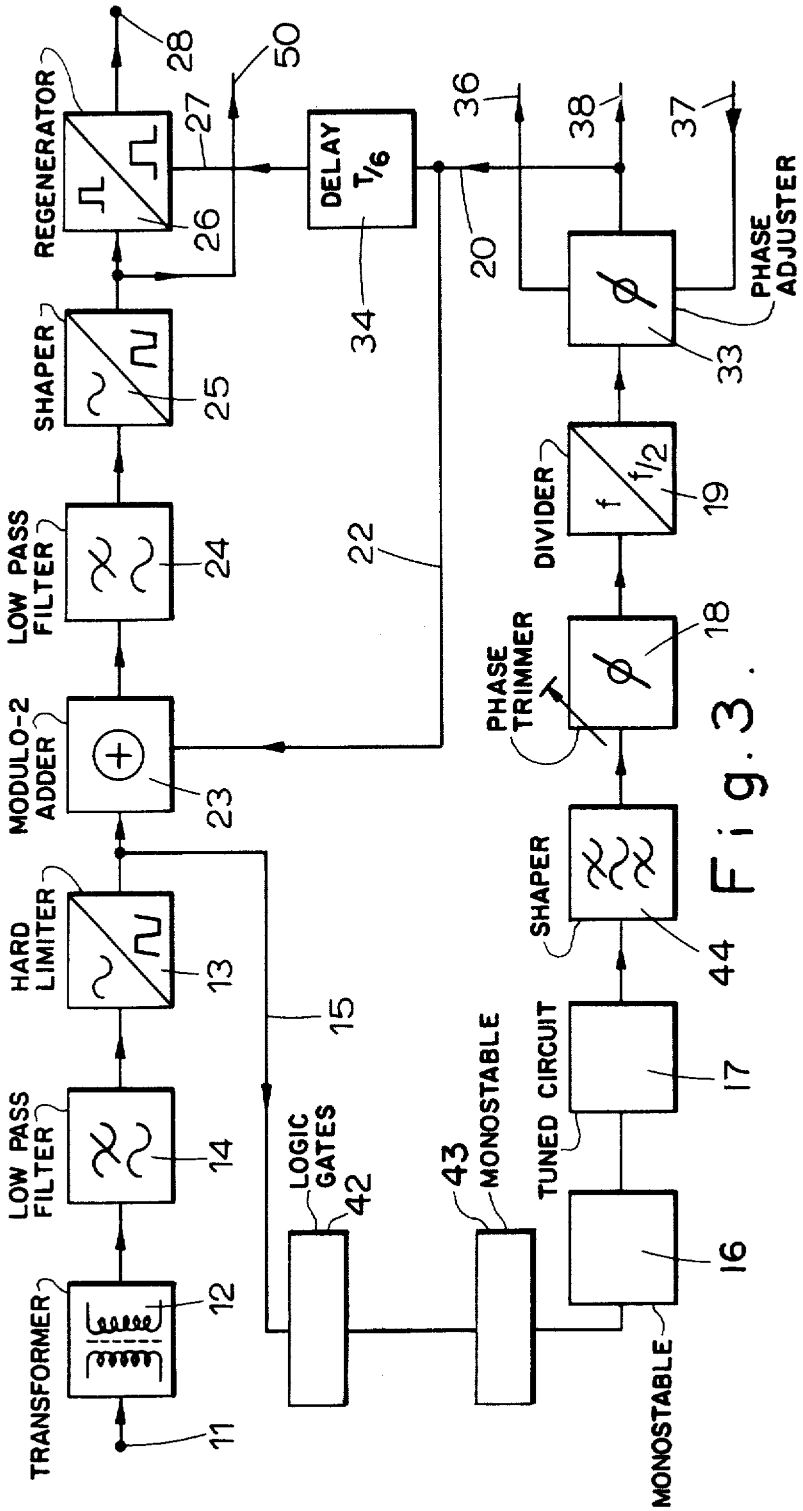
FIG. 3 shows a block diagram of a diphase receiver according to the invention.
Figure 4:
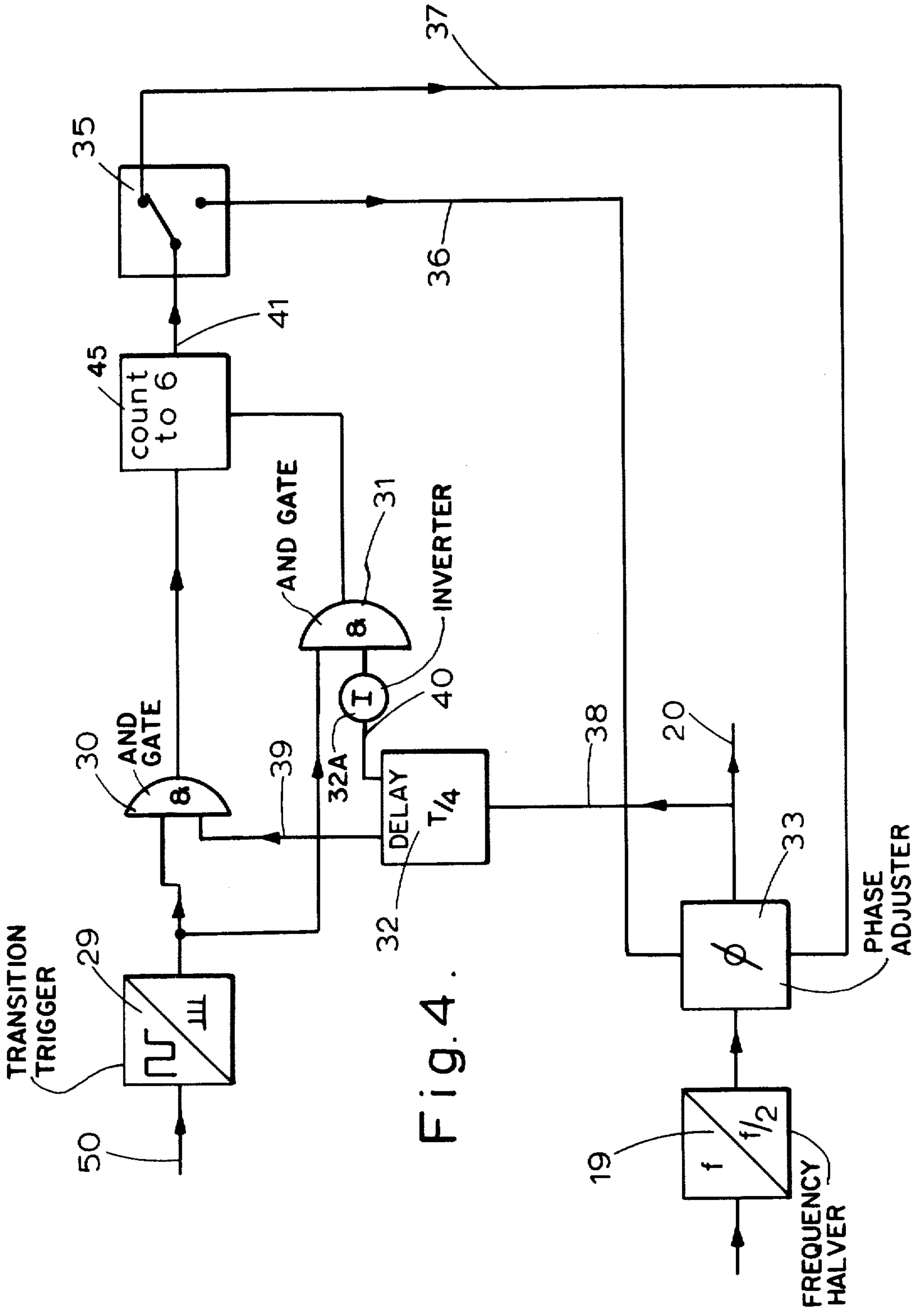
FIG. 4 shows a block diagram of a phase ambiguity detector for use with the diphase receiver shown in FIG. 3.

Referring now to FIGS. 3 and 4, a diphase signal is fed from an external line (not shown) to an input terminal 11, and passes to a line transformer 12, which acts as a high pass filter with a 3dB loss at 5KHz.

From the line transformer 12, the signal is passed via a low pass filter 14 to a hard limiter 13. The low pass filter is a third order low pass Butterworth filter with a 3dB loss at 100 kHz. The hard limiter comprises two open loop integrated circuit operational amplifiers followed by a TTL gate. The output from hard limiter 13 is fed to a series of logic gates 42, which produce narrow pulses each time a transition occurs at the limiter output. These pulses are fed to a mono-stable element 43 which produces a pulse of width just less than T/2, where T is the duration of one element of the isochronous baseband data signal (i.e., 16.7 microseconds in this example). The output of mono-stable 43 is fed to a second mono-stable element 16 which produces pulses T/4 seconds, wide. The purpose of the first mono-stable is to ensure that T/4 pulses are not produced on line transitions caused by the modulating data, since these occur only T/4 seconds after transitions caused by the carrier. The output of mono-stable 16 is attenuated and fed to a tuned circuit or narrow band pass filter 17. The elements 42, 43 16 and 17 act as a harmonic generator, generating a second harmonic of the carrier signal. The tuned circuit may comprise a pair of series connected transistors with parallel tuned circuits connected to their collectors. These tuned circuits have a 3dB bandwidth of 1kHz at a centre frequency of 120 kHz.

The diphase signal fed in on terminal 11 contains no steady carrier component, as the carrier phase is switched through 180° in a random sequence depending on the transmitted data.

When the signal passes through elements 42, 43 and 16, however, a strong second harmonic of the carrier is developed and the filter or tuned circuit 17 is tuned to pass this frequency. The output of the filter 17 is squared by shaper 44 and fed to a variable phase trimmer 18 and then to a frequency divider circuit 19 which divides the frequency by two.

The phase relationship between the carrier and the demodulated data is not independent of the loss characteristic of the line. In fact a linear variation of insertion loss causes the data transitions in the modulated line signal to move relative to the carrier transitions. This does not cause any demodulation problems since the data information is recovered from the line signal and is therefore in the correct phase for demodulation. However a clock signal is derived from the carrier, and if the clock is positioned so as to regenerate the received eye-diagram correctly with the two modems connected back-to-back, then after transmission over a line with a linear variation of insertion loss,, with frequency the position of the clock transitions can have moved up to a maximum of T/3 seconds. This problem can be dealt with by off-setting the clock from the centre of the eye by T/6 seconds when modems are in the back-to-back position, so that optimum regeneration occurs on a medium length line and a clock off-set beyond the centre of the eye is tolerated on longer routes. Delay element 34 introduces this delay into the recovered carrier frequency or clock signal which then acts as a delayed clock signal.

The output of circuit 19 is a clock signal at the carrier frequency, controlled in phase by phase adjuster 33, this clock signal is fed via lines 20 and 22 to form an input to a modulo-2 adder 23 which receives the line signal output from hard limiter 13 as a second input. The modulo-2 adder functions as a phase demodulator. The output of the adder 23 is fed to a fifth order low pass Bessel filter 24, which has a 2dB loss at 30kHz. The output of filter 24 is squared in a shaper 25, and the shaped signal is passed to a regenerator 26 in which it is retimed by means of the delayed carrier signal input on line 27 to produce an isochronous baseband data signal at output 28. The phase of the carrier is adjusted by element 18 to balance the delays introduced by units 16, 17, 24 and 25, in order to obtain maximum output from unit 24.

Since the clock signal on line 20 is derived by a process of multiplication and division it is possible for the clock phase to be in error by 180°. An ambiguity detector is provided to detect and correct such a phase error if it should arise. The only information available in the receiver as to which is the correct phase comes from the transitions of the demodulated signal and so it is these transisions that have to be used in the ambiguity detector to correct the clock phase. If the received line signal is distortion and error free there is no problem in setting the clock in the correct phase. However, a single misplaced transition (due to errors or distortions introduced in the line signals) in the demodulated signal will result in repeated subsequent element errors induced by an erroneous correction to the clock phase. It is thus desireable that the clock phase is not incorrectly adjusted in response to a single detected error in the relative positions of clock and data signal transitions.

Normally the carrier recovery is much less susceptable to noise than the demodulated signal and there will be an incorrect transition on the demodulated data because of noise which would not have affected the carrier phase. A counter is therefore included to detect a number $n$ of consecutively incorrect transitions before any phase correction is applied. If $n$ is too small, say only 1, this incorrectly placed transition would cause the phase of the clock to be changed incorrectly. On the other hand if $n$ is too large and the clock does get into the incorrect phase, too many errors will have occurred before the correction is made. It has been found that $n$ equal to 6 was sufficient to give adequate performance in the presence of gaussian noise, however other values may be appropriate in other circumstances. If three modems are connected in tandem as regenerators there is an additional problem associated with the ambiguity detectors in that if the clock at the first modem does change phase, then although the phase of the recovered clock at the second modem will not change, the transitions of the recovered data will have been moved and after $n$ transitions the ambiguity detector at the second modem will operate to change the phase of the carrier. But at the same time the ambiguity detector in the first modem will correct the phase of its clock, making the relative phases of the clock and data at the second modem incorrect again and it will be a further n transitions before this is corrected. Thus if m modems are connected in tandem there will be a period during which at least $m \times n$ transitions occur at the last receiver when the clock phase will be changing and this will cause a large number of errors.

To ensure that the number of clock transitions at the final receiver is kept as near as possible to the correct number, the ambiguity detector in all modems is arranged to alternately delete and insert clock transitions when correcting the clock phase. This means that only when the clock error occurs in the final receiver will there be one more or one less clock transition in the clock signal recovered from the carrier signal.

The ambiguity detector is shown in diagrammatic form in FIG. 4. The output of frequency divider 19 is fed to phase adjuster 33, which can either advance or retard the phases of the clock signal derived from the carrier by 180°, depending on whether the signal received from switch 35 is on line 36 or 37. The clock signal on line 38 is passed to delay unit 32 which delays the clock by T/4. An erect output from delay unit 32 is passed to AND gate 30 on line 39, and an inverted output from inverter 32A passed to AND gate 31 on line 40. The transition trigger 29 produces narrow pulses corresponding to the transitions of the restituted data signal on line 50. These narrow pulses are fed to AND gates 30 and 31. Thus when there is an error in the clock phase i.e. the temporal separation of data signal transition and clock signal transitions exceeds a predetermined magnitude, error pulse is produced by AND gate 30. Thus AND gates 30 and 31 temporally compare transitions in the data signal with transitions in the clock signal. These error pulses are counted by counter 45. If however the clock phase is correct an reset pulse is produced by AND gate 31, which resets the counter 45. When 6 consecutive errors in the clock phase have been counted by counter 45, an output is produced on line 41 which causes switch 45 to change state and hence activates phase adjuster 33 to correct the clock phase. Thus the phase of the clock signal is examined and corrected is necessary at discreet time intervals dictated by the occurrence of transitions in the data and clock signal.

Consecutive corrections to the clock phase are made by alternately advancing and retarding the phase by 180°.

An advantage of the present invention is that it enables line equalisers to be dispensed with for reasons set out earlier in this specification but it may be useful in some cases to employ a compromise equaliser which produces an attenuation-frequency characteristic intermediate between an unequalized line and a fully equalised line.

I claim:

1. A method of converting a modulated carrier signal modulated by an isochronous baseband data signal into an isochronous baseband data signal, said modulated carrier signal modulated by an isochronous baseband data signal hereinafter referred to as a diphase signal, including the steps of:

a. deriving a clock signal having a frequency equal to the reciprocal of the duration T of one element of the baseband data from the said carrier signal by isolating a $p^{th}$ harmonic, where $p = 2$, of said carrier signal and frequency dividing said harmonic by p to give said clock signal;

b. deriving a data signal by modulo-2 addition of said diphase signal and said clock signal;

c. temporally comparing transitions in said data signal with transitions in said clock signal and phase adjusting said clock signal by $360°/p$ when transitions in said clock signal and transitions in said data signal have a temporal separation in excess of a predetermined magnitude; and d. deriving said isochronous baseband data signal from said data signal by retiming said data signal with a delayed clock signal, said delayed clock signal delayed by substantially T/6 with respect to said clock signal.

2. A method of converting a carrier modulated by an isochronous baseband data signal, said modulated carrier signal hereinafter referred to as a diphase signal into an isochronous baseband data signal including the steps of:

a. deriving a clock signal having a frequency equal to the reciprocal of the duration T of one element of said baseband data from said carrier signal by isolating a $p^{th}$ harmonic where $p = 2$ out of said carrier signal and frequency dividing said harmonic by p;

b. deriving a data signal by modulo-2 addition of said diphase signal and said clock signal;

c. temporally comparing at discrete time instants, transitions in said data signal with transitions in said clock signal and deriving an error signal when said transitions in said data signal have a temporal separation from transitions in said clock signal in excess of a predetermined magnitude;

d. counting said error signals and phase adjusting said clock signal by 360°/p when error signals are counted at n consecutive instants, consecutive phase adjustments of said clock signal being made in opposite senses; and deriving said isochronous baseband signal from said data signal.

3. A method of converting a diphase signal into an isochronous baseband data signal as claimed in claim 2 wherein the step of deriving said isochronous baseband signal from said data signal includes retiming said data signal by a delayed phase adjusted clock signal, said delayed phase adjusted clock signal having been delayed by substantially T/6 with respect to said adjusted clock signal.

4. A diphase to baseband converter wherein a clock signal is derived from a carrier signal modulated by an isochronous baseband data signal, said carrier signal modulated by an isochronous baseband data signal being herein referred to as a diphase signal, the clock signal and said carrier signal having a common frequency equal to the reciprocal of the duration, T, of one element of the isochronous baseband data signal, said converter comprising:

a. receiving means for receiving said diphase signal;

b. clock signal means for generating said clock signal connected to said receiving means, said clock signal means including harmonic generator means for generating a $p^{th}$ harmonic, where $p = 2$, of said carrier, and frequency divider means, connected in series;

c. a modulo-2 adder having a first input connected to said receiving means, a second input connected to said clock signal means, producing an output data signal;

d. an ambiguity detector for comparing transitions in said output data signal with transitions in said clock signals, and producing an actuating signal when said transitions in said data signal and transitions in said clock signal have a temporal separation in excess of a predetermined magnitude, said ambiguity detector connected to a phase adjuster which is connected to the output of said frequency divider means, said phase adjuster operable when actuated to phase adjust said clock signal by 360°/p; and e. means for deriving said isochronous baseband data signal from said output data signal, including timer means for retiming said data signal with reference to said clock signal to produce said isochronous baseband data signal, said timer means connected to said phase adjusted clock signal means via delay means for delaying said clock signal by T/6.

5. A diphase to baseband converter wherein a clock signal is derived from a carrier signal modulated by an isochronous baseband data signal, said carrier signal modulated by an isochronous baseband data signal being herein referred to as a diphase signal, the clock signal and said carrier signal having a common frequency equal to the reciprocal of the duration, T, of one element of the isochronous baseband data signal, said converter comprising:

a. receiving means for receiving said diphase signal;

b. clock signal means, arranged to receive said diphase signal, said clock signal means including harmonic generator means for generating a $p^{th}$ harmonic where $p = 2$, of said carrier, and frequency divider means, connected in series, to produce said clock signal;

c. a modulo-2 adder having a first input connected to said receiving means, a second input connected to said clock signal means, producing an output data signal;

d. an ambiguity detector including transition comparator means for comparing transitions in said clock signal with transitions in said output data signal at discrete intervals and producing an error pulse when transitions in said data signal and transitions in said clock signal have a temporal separation in excess of a predetermined magnitude, and counter means for counting the error pulses, said counter means arranged to produce an actuating signal when n consecutive error pulses have been counted, said actuating signal actuating a phase adjuster connected to an output of said frequency divider means, said phase adjuster having an output connected to said transition comparator means, said phase adjuster operable to phase adjust said clock signal by 360°/p;

e. reset means for resetting said counter means, said reset means actuated by said transition comparator means when said temporal separation lies within said predetermined limits; and f. means for deriving said isochronous baseband data signal from said output data signal.

6. A diphase to baseband converter as claimed in claim 5 including means responsive to consecutive actuating signals to cause said phase adjuster to produce alternate phase adjustments in opposite senses.

7. A diphase to baseband converter as claimed in claim 5 wherein said means for deriving said isochronous baseband data signal from said output data signal, includes timer means for retiming said output data signal with reference to said phase adjusted clock signal to produce said isochronous baseband data signal, said timer means being connected to said phase adjusted via a delay means, said delay means arranged to delay said clock signal by T/6.

* * * * *